US010440667B2

(12) United States Patent
Zhang (10) Patent No.: US 10,440,667 B2
(45) Date of Patent: Oct. 8, 2019

(54) ACCESS TERMINAL

(71) Applicant: ZTE CORPORATION, Shenzhen, Guangdong (CN)

(72) Inventor: Ruifeng Zhang, Guangdong (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 49 days.

(21) Appl. No.: 15/577,627

(22) PCT Filed: Oct. 9, 2015

(86) PCT No.: PCT/CN2015/091557
§ 371 (c)(1),
(2) Date: Nov. 28, 2017

(87) PCT Pub. No.: WO2016/192262
PCT Pub. Date: Dec. 8, 2016

(65) Prior Publication Data
US 2018/0139707 A1    May 17, 2018

(30) Foreign Application Priority Data
May 29, 2015    (CN) .................... 2015 2 0362827 U (51) Int. Cl.
*H04W 52/38* (2009.01)
*H02J 7/00* (2006.01)
(Continued)

(52) U.S. Cl.
CPC ............ *H04W 52/386* (2013.01); *G06F 1/26* (2013.01); *H02J 1/10* (2013.01); *H02J 7/00* (2013.01);
(Continued)

(58) Field of Classification Search
CPC ........ G06F 16/00; G06F 13/4072; G06F 1/26; G06F 1/3206; G06F 1/32; G06F 13/16;
(Continued)

(56) References Cited

U.S. PATENT DOCUMENTS 6,212,403 B1    4/2001 Ushiroda
8,843,178 B1    9/2014 Wong
(Continued)

FOREIGN PATENT DOCUMENTS

CN    102056348 A    5/2011
CN    203106076 U    8/2013
(Continued)

OTHER PUBLICATIONS

International Search Report dated Feb. 6, 2016 for International Application No. PCT/CN2015/091557, 9 pages.
(Continued)

*Primary Examiner* — Ajibola A Akinyemi
(74) *Attorney, Agent, or Firm* — Knobbe Martens Olson & Bear LLP (57) ABSTRACT

Disclosed embodiments include an access terminal including a controller, an interface and a power manager. The interface can be connected to an external adapter and/or an external mobile power supply. The power manager can be connected to the interface and the controller, and can be configured to manage power supplied to the access terminal. The controller can be configured to, when confirming that the interface is not connected to the external adapter and is connected to the external mobile power supply, control the external mobile power supply to power the access terminal through the power manager.

10 Claims, 4 Drawing Sheets

(51) Int. Cl.
*H04W 88/08* (2009.01)
*G06F 1/26* (2006.01)
*H02J 1/10* (2006.01)
*H04W 88/02* (2009.01)

(52) U.S. Cl.
CPC .......... *H02J 7/0055* (2013.01); *H02J 7/0063* (2013.01); *H02J 7/0068* (2013.01); *H04W 88/08* (2013.01); *H04W 88/02* (2013.01)

(58) Field of Classification Search
CPC .... G06F 1/266; G06F 13/385; G06F 13/4081; G06F 1/3209; G06F 1/325; G06F 2213/0042; G06F 3/012; G06F 3/033; G06F 3/03543; G06F 13/362
USPC ........................................................ 455/572
See application file for complete search history.

(56) References Cited

U.S. PATENT DOCUMENTS

2005/0245254 A1 11/2005 Hall
2011/0006603 A1* 1/2011 Robinson ................ G06F 1/263
 307/31
2016/0344218 A1* 11/2016 Zhang .................... H02J 7/045

FOREIGN PATENT DOCUMENTS

CN 203181243 U 9/2013
CN 203301754 U 11/2013

OTHER PUBLICATIONS

Extended European Search Report of corresponding Patent Application No. 15893913.2-8 pages (dated Sep. 20, 2018).

* cited by examiner

ACCESS TERMINAL

CROSS REFERENCE TO RELATED APPLICATIONS

This application is the U.S. National Phase Application under 35 U.S.C. § 371 of International Application No. PCT/CN2015/091557 filed, filed Oct. 9, 2015, designating the U.S. and published as WO 2016/192262 A1 on Dec. 8, 2016 which claims the benefit of Chinese Patent Application No. 201520362827.7, filed May 29, 2015, both of which are hereby incorporated by reference in their entirety.

TECHNICAL FIELD

The present disclosure relates to the field of communication technology, and in particular, to an access terminal.

BACKGROUND

With the rapid development of wireless networks such as Long Term Evolution (LTE) networks, 4G (the 4th Generation mobile communication technology) networks and 5G (the 5th Generation mobile communication technology) networks, great changes have taken place in people's lives, work, entertainment and communications. At the same time, people have higher requirements for wireless access terminals, such as wireless access routers, at homes, offices and other immobile sites.

Most of existing wireless access terminals have no built-in battery and are only powered by an adapter. Although some existing wireless access terminals have a built-in battery, such wireless access terminals can only work for a short time in an emergency such as power failure, due to small capacity of the built-in battery and large power consumption of the wireless access terminals. However, as people's lifestyle changes, outdoor activities become more and more frequent, and there is an increasing demand for outdoor use of wireless access terminals. Therefore, it is an urgent problem to be solved to provide an access terminal powered by an external mobile power supply.

SUMMARY

In view of the above, embodiments of the present disclosure aim to provide an access terminal capable of being powered by an external mobile power supply.

The embodiments of the present disclosure are implemented as follows.

The present disclosure provides an access terminal including a controller, an interface and a power manager. The interface is connected to an external adapter and/or an external mobile power supply. The controller is configured to, when confirming that the interface is not connected to the external adapter and is connected to the external mobile power supply, control the external mobile power supply to power the access terminal through the power manager. The power manager is connected to the interface and the controller, and is configured to manage power supplied to the access terminal.

In an embodiment, the interface includes a power interface for being connected to the external adapter.

Accordingly, when confirming that the power interface is connected to the external adapter, the controller is configured to control the external adapter to power the access terminal.

In an embodiment, the interface includes a communication interface for being connected to the external mobile power supply and a power interface for being connected to the external adapter.

The access terminal further includes a communication interface charging circuit connected to the communication interface.

Accordingly, the controller is configured to control the communication interface charging circuit to be turned on to enable the power manager to be connected to the communication interface; and control the power manager to charge the external mobile power supply.

In an embodiment, the interface includes a communication interface for being connected to a second external mobile power supply and a power interface for being connected to a first external mobile power supply.

The access terminal further includes a communication interface charging circuit configured to connect the power manager and the communication interface.

Accordingly, the controller is configured to control the communication interface charging circuit to be turned on to enable the power manager to be connected to the communication interface; control the power manager to charge the first external mobile power supply; and control the second external mobile power supply to power the access terminal through the power manager.

In an embodiment, the interface includes a communication interface for being connected to the external mobile power supply.

The access terminal further includes a communication interface power supply circuit configured to connect the communication interface and the power manager.

Accordingly, the controller is configured to control the communication interface power supply circuit to be turned on to enable the power manager to be connected to the communication interface; and control the external mobile power supply to power the access terminal through the power manager.

In an embodiment, the interface further includes a detector configured to detect a voltage value at the interface for being connected to the external adapter.

Accordingly, when the voltage value does not belong to a first threshold range, the controller confirms that the access terminal is not connected to the external adapter.

In an embodiment, the access terminal further includes a detector configured to detect a voltage value at the interface.

Accordingly, when the voltage value belongs to a second threshold range, the controller confirms that the access terminal is connected to the external mobile power supply.

Alternatively, the access terminal further includes a detector configured to detect whether a connecting line of the interface for being connected to the external mobile power supply is short-circuited.

Accordingly, when the connecting line is short-circuited, the controller confirms that the access terminal is connected to the external mobile power supply.

The present disclosure provides an access terminal including a controller, an interface and a power manager. The controller is configured to, when confirming that the interface of the access terminal is not connected to an external adapter and is connected to an external mobile power supply, to control the external mobile power supply to power the access terminal through the power manager. The interface is connected to the external adapter and/or the external mobile power supply. The power manager is connected to the interface and the controller, and is configured to manage power supplied to the access terminal. In this way, the access terminal is powered by the external mobile power supply, thereby increasing portability and mobility of the access terminal.

DETAILED DESCRIPTION

Embodiments of the present disclosure provide an access terminal including a controller, an interface and a power manager. The controller is configured to, when confirming that the interface of the access terminal is not connected to an external adapter and is connected to an external mobile power supply, control the external mobile power supply to power the access terminal through the power manager. The interface is connected to the external adapter and/or the external mobile power supply. The power manager is connected to the interface and the controller, and is configured to manage power supplied to the access terminal.

The present disclosure will be further described below according to the accompanying drawings and embodiments.

Figure 1:
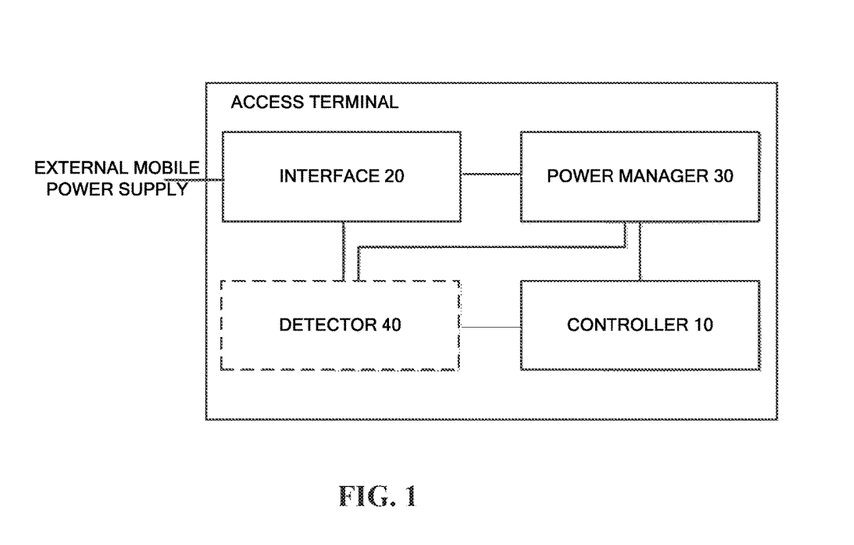
FIG. 1 is a schematic structure diagram of an access terminal according to an embodiment of the present disclosure.

FIG. 1 is a schematic structure diagram of an access terminal according to an embodiment of the present disclosure. As shown in FIG. 1, the access terminal includes a controller 10, an interface 20 and a power manager 30.

The controller 10 is configured to, when confirming that the interface 20 of the access terminal is not connected to an external adapter and is connected to an external mobile power supply, control the external mobile power supply to power the access terminal.

The interface 20 is configured to be connected to the external adapter and/or the external mobile power supply.

The power manager 30 is configured to manage power supplied to the access terminal.

In the embodiment of the present disclosure, the access terminal further includes a detector 40 configured to detect a voltage value at the interface 20, and to send the voltage value to the controller 10.

Accordingly, the controller 10 is configured to, when the voltage value does not belong to a first threshold range, confirm that the access terminal is connected to the external adapter.

The first threshold range is 9V to 12V.

In the embodiment of the present disclosure, the access terminal further includes a detector 40 configured to detect a voltage value at the interface 20 and to send the voltage value to the controller 10. Accordingly, the controller 10 is configured to, when the voltage value belongs to a second threshold range, confirm that the access terminal is connected to the external mobile power supply.

Optionally, the detector 40 is configured to detect whether a connecting line of the interface for being connected to the external mobile power supply is short-circuited. Accordingly, the controller 10 is configured to, when the connecting line is short-circuited, confirm that the access terminal is connected to the external mobile power supply.

The second threshold range is 4.8V to 5V.

In the embodiment of the present disclosure, the controller 10 is further configured to, when confirming that the access terminal is connected to the external adapter, control the external adapter to power the access terminal.

Embodiment I of the Access Terminal

Figure 2:
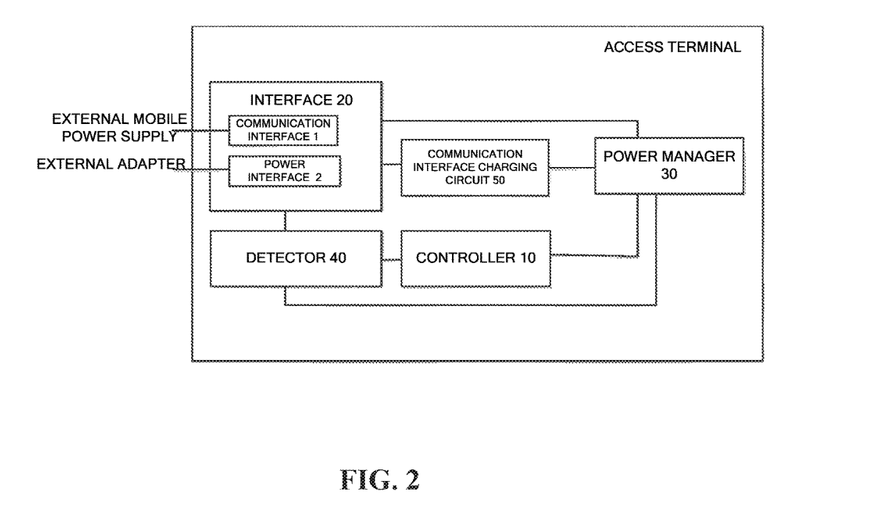
FIG. 2 is a schematic structure diagram of an access terminal according to embodiment I of the present disclosure.

FIG. 2 is a schematic structure diagram of an access terminal according to embodiment I of the present disclosure. As shown in FIG. 2, the access terminal includes a controller 10, an interface 20, a power manager 30, a detector 40 and a communication interface charging circuit 50.

The interface 20 includes a communication interface 1 and a power interface 2.

The communication interface 1 is configured to be connected to an external mobile power supply.

The power interface 2 is configured to be connected to an external adapter.

The detector 40 is configured to detect voltage values at the communication interface 1 and the power interface 2, and to send the detected voltage values to the controller 10.

The controller 10 is configured to confirm that the communication interface 1 is connected to the external mobile power supply and the power interface 2 is connected to the external adapter based on the detection result sent from the detector 40; and control the external adapter to power the access terminal through the power manager 30.

The controller 10 is further configured to control the communication interface charging circuit 50 to be turned on to enable the power manager 30 to be connected to the communication interface 1 through the communication interface charging circuit 50; and control the power manager 30 to charge the external mobile power supply through the communication interface charging circuit 50.

The power manager 30 is configured to manage power supplied to the access terminal.

Specifically, the power manager 30 is configured to convert the power supplied to the access terminal into a voltage suitable for the controller 10 and the detector 40 herein.

Embodiment II of the Access Terminal

Figure 3:
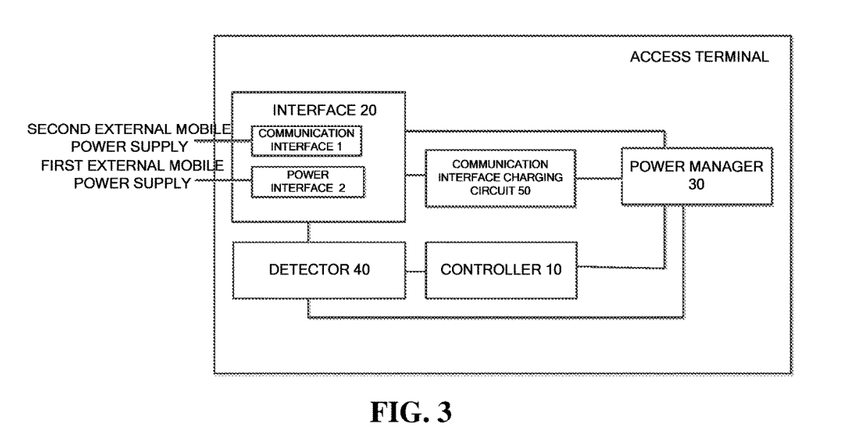
FIG. 3 is a schematic structure diagram of an access terminal according to embodiment II of the present disclosure.

FIG. 3 is a schematic structure diagram of an access terminal according to embodiment II of the present disclosure. The access terminal includes a controller 10, an interface 20, a power manager 30, a detector 40 and a communication interface charging circuit 50.

The interface 20 includes a communication interface 1 and a power interface 2.

The communication interface 1 is configured to be connected to a second external mobile power supply.

The power interface 2 is configured to be connected to a first external mobile power supply.

The detector 40 is configured to detect voltage values at the communication interface 1 and the power interface 2, and to send the detected voltage values to the controller 10.

The controller 10 is configured to confirm that the communication interface 1 is connected to the second external mobile power supply and the power interface 2 is connected to the first external mobile power supply based on the detection result sent from the detector 40; and control the second external mobile power supply to power the access terminal through the power manager 30.

The controller 10 is further configured to control the communication interface charging circuit 50 to be turned on to enable the power manager 30 to be connected to the communication interface 1 through the communication interface charging circuit 50; and control the power manager 30 to charge the second external mobile power supply through the communication interface charging circuit 50.

The power manager 30 is configured to manage power supplied to the access terminal.

Specifically, the power manager 30 is configured to convert the power supplied to the access terminal into a voltage suitable for the controller 10 and the detector 40 herein.

Embodiment III of the Access Terminal

Figure 4:
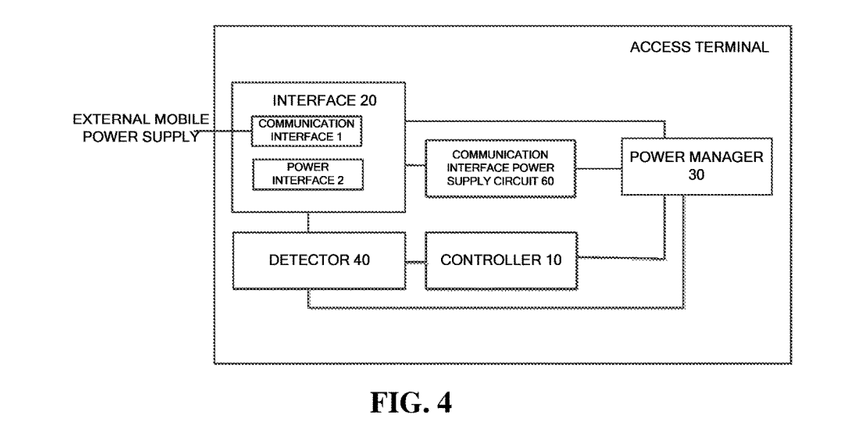
FIG. 4 is a schematic structure diagram of an access terminal according to embodiment III of the present disclosure.

FIG. 4 is a schematic structure diagram of an access terminal according to embodiment III of the present disclosure. The access terminal includes a controller 10, an interface 20, a power manager 30, a detector 40 and a communication interface power supply circuit 60.

The interface 20 includes a communication interface 1 and a power interface 2.

The communication interface 1 is configured to be connected to an external mobile power supply.

The detector 40 is configured to detect voltage values at the communication interface 1 and the power interface 2, and to send the detected voltage values to the controller 10.

The controller 10 is configured to confirm that the communication interface 1 is connected to the external mobile power supply and the power interface 2 is not connected to the external adapter based on the voltage values sent from the detector 40.

The controller 10 is further configured to control the communication interface power supply circuit to be turned on to enable the power manager 30 to be connected to the communication interface 1 through the communication interface power supply circuit 60; and control the external mobile power supply to power the access terminal through the power manager 30.

Embodiment IV of the Access Terminal

Figure 5:
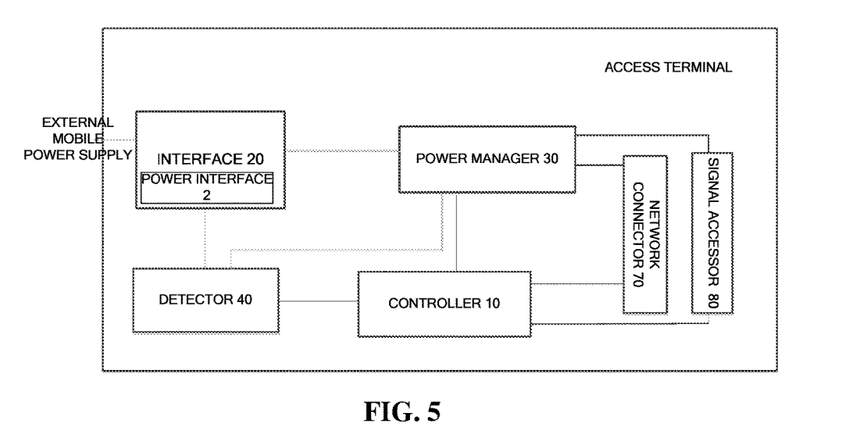
FIG. 5 is a schematic structure diagram of an access terminal according to embodiment IV of the present disclosure.

FIG. 5 is a schematic structure diagram of an access terminal according to embodiment IV of the present disclosure. The access terminal includes a controller 10, an interface 20, a power manager 30, a detector 40, a network connector 70 and a signal accessor 80.

The interface 20 includes a power interface 2.

The controller 10 is configured to confirm whether the power interface 2 is connected to an external mobile power supply.

The power manager 30 is configured to manage power supplied to the access terminal.

Specifically, the power manager 30 is configured to convert the power supplied to the access terminal into a voltage suitable for the controller 10 and the detector 40.

The detector 40 is configured to detect a voltage at the power interface 2, and to send the detection result to the controller 10.

The controller 10 is further configured, when confirming that the power interface 2 is connected to the external mobile power supply, to control the external mobile power supply to power the access terminal through the power manager 30.

Embodiment V of the Access Terminal

Figure 6:
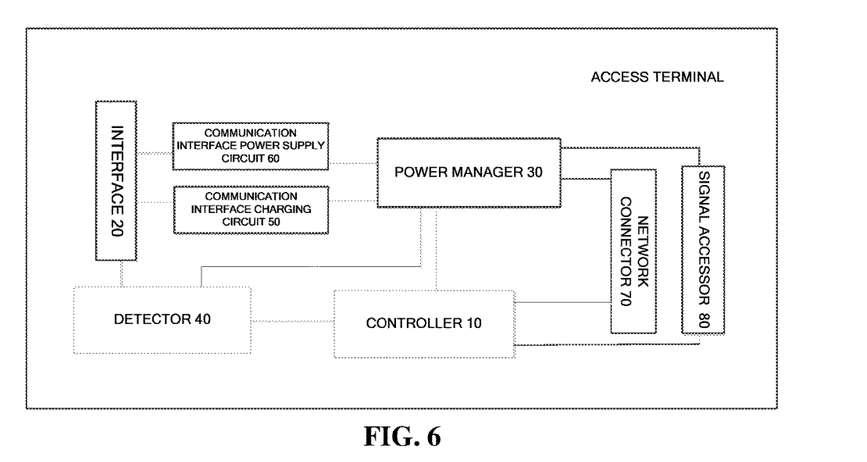
FIG. 6 is a schematic structure diagram of an access terminal according to embodiment V of the present disclosure.

FIG. 6 is a schematic structure diagram of an access terminal according to embodiment V of the present disclosure. The access terminal includes a controller 10, an interface 20, a power manager 30, a detector 40, a communication interface charging circuit 50, a communication interface power supply circuit 60, a network connector 70 and a signal accessor 80.

Figure 7:
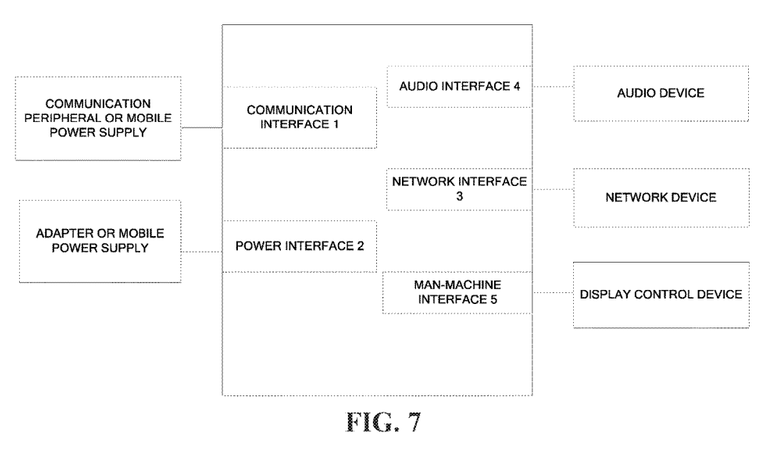
FIG. 7 is a schematic structure diagram of an interface according to an embodiment of the present disclosure.

FIG. 7 is a schematic structure diagram of the interface 20. The interface 20 includes a communication interface 1, a power interface 2, a network interface 3, an audio interface 4 and a man-machine interface 5.

The controller 10 is configured to confirm whether the communication interface 1 is connected to an external mobile power supply, and to confirm whether the power interface 2 is connected to an external adapter or an external mobile power supply.

The power manager 30 is configured to manage power supplied to the access terminal.

Specifically, the power manager 30 is configured to convert the power supplied to the access terminal into a voltage suitable for the controller 10, the detector 40, the network connector 70 and the signal accessor 80.

The detector 40 is configured to detect whether the communication interface 1 is short-circuited and to detect voltages at the communication interface 1 and the power interface 2; and to send the detection result to the controller 10 and general-purpose input/output (GPIO) interface of a central processing unit (CPU) of the signal accessor 80.

The communication interface 1 is configured to be connected to the external mobile power supply for powering the access terminal. The communication interface 1 is further configured to be connected to other external devices and to exchange data with the controller 10.

The communication interface 1 may be a USB interface.

The power interface 2 is configured to be connected to the external mobile power supply or an external adapter.

The network connector 70 is configured to establish a network.

The network may be a wireless local area network. The network connector 70 is connected to the controller 10 to establish a transmission channel for second data.

Accordingly, the controller 10 is further configured to process the second data.

Herein, the second data is interactive data through a network such as a wireless local area network, for example downlink radio frequency signal data transmitted from the network connector 70 to the controller 10 or uplink radio frequency signal data transmitted from the controller 10 to the network connector 70.

The signal accessor 80 is configured to access a network signal.

The network signal may be a wireless broadband signal. The signal accessor 80 is connected to the controller 10 to establish a transmission channel for first data.

Accordingly, the controller 10 is further configured to process the first data.

Herein, the first data is wireless broadband interactive data including 3G/4G downlink data that is received by the signal accessor 80 and then transmitted to the controller 10 or uplink data that is transmitted from the controller 10 to the signal accessor 80. The signal accessor 80 converts the received uplink data into a 3G/4G wireless broadband signal and then transmits the 3G/4G wireless broadband signal.

The network interface 3 is connected to the controller 10 to allow an external network device such as a computer to be connected to the controller 10.

Herein, the network interface 3 may be an RJ45 interface.

The audio interface 4 is connected to the controller 10 to allow an external device such as a telephone to be connected to the controller 10. Herein, the audio interface 4 may be an RJ11 interface.

The human-machine interface 5 is connected to the controller 10 to allow an external device to be connected to the controller 10, to receive user operations and to display a working state of the access terminal.

In practical use, the detector 40 is composed of multiple electronic components including at least a voltage comparator, a logic gate, a resistor, a transistor and a metal oxide semiconductor (MOS) transistor; the power manager 30 is composed of power supply chips including at least a DC/AC converter, a low dropout regulator (LDO) and a charging management chip; and the communication interface charging circuit 50 and the communication interface power supply circuit 60 are composed of components including at least a MOS transistor, a transistor, a DCDC and an LDO. The controller 10, the network connector 70 and the signal accessor 80 may all be implemented by a processor and certainly may also be implemented by a specific logic circuit. Herein, the processor may be a processor on the access terminal. In practical use, the processor may be a CPU, a microprocessor unit (MPU), a digital signal processor (DSP) or a field-programmable gate array (FPGA) and the like.

The above are only preferred embodiments of the present disclosure and are not intended to limit the scope of the present disclosure.

What is claimed is:

1. An access terminal, comprising a controller, an interface and a power manager, wherein
    the interface is for being connected to at least one of an external adapter and an external mobile power supply;
    the controller is configured to, when confirming that the interface is not connected to the external adapter and is connected to the external mobile power supply, control the external mobile power supply to power the access terminal through the power manager; and
    the power manager is connected to the interface and the controller, and is configured to manage power supplied to the access terminal;
    wherein the interface comprises a communication interface for being connected to the external mobile power supply;
    the access terminal further comprises a communication interface power supply circuit configured to connect the communication interface and the power manager; and
    the controller is configured to control the communication interface power supply circuit to be turned on to enable the power manager to be connected to the communication interface; and control the external mobile power supply to power the access terminal through the power manager;
    wherein the access terminal further comprises a detector configured to detect whether a connecting line of the interface configured to be connected to the external mobile power supply is short-circuited; when the connecting line is short-circuited, the controller is configured to indicate that the access terminal is connected to the external mobile power supply, and
    wherein the detector comprises a voltage comparator.

2. The access terminal according to claim 1, wherein the interface further comprises a power interface configured to be connected to the external adapter; wherein the controller is further configured to, when indicating that the power interface is connected to the external adapter, control the external adapter to power the access terminal.

3. The access terminal according to claim 2, wherein the detector is further configured to detect a voltage value at the interface, wherein when the voltage value belongs to a second threshold range, the controller confirms that the access terminal is connected to the external mobile power supply.

4. The access terminal according to claim 1, wherein the interface further comprises a power interface configured to be connected to the external adapter;
    wherein the access terminal further comprises a communication interface charging circuit configured to be connected to the communication interface; and
    the controller is further configured to be configured to control the communication interface charging circuit to be turned on to enable the power manager to be connected to the communication interface, and to control the power manager to charge the external mobile power supply.

5. The access terminal according to claim 4, wherein the detector is further configured to detect a voltage value at the interface, wherein when the voltage value belongs to a second threshold range, the controller confirms that the access terminal is connected to the external mobile power supply.

6. The access terminal according to claim 1, wherein the interface further comprises a communication interface configured to be connected to a second external mobile power supply and a power interface configured to be connected to a first external mobile power supply;
    wherein the access terminal further comprises a communication interface charging circuit configured to connect the power manager and the communication interface for being connected to the second external mobile power supply; and
    the controller is further configured to control the communication interface charging circuit to be turned on to enable the power manager to be connected to the communication interface for being connected to the second external mobile power supply, to control the power manager to charge the first external mobile power supply, and to control the second external mobile power supply to power the access terminal through the power manager.

7. The access terminal according to claim 6, wherein the detector is further configured to detect a voltage value at the interface for being connected to the external adapter; wherein
    when the voltage value does not belong to a first threshold range, the controller confirms that the access terminal is not connected to the external adapter.

8. The access terminal according to claim 6, wherein the detector is further configured to detect a voltage value at the interface, wherein when the voltage value belongs to a second threshold range, the controller confirms that the access terminal is connected to the external mobile power supply.

9. The access terminal according to claim 1, wherein the detector is further configured to detect a voltage value at the interface for being connected to the external adapter; wherein
    when the voltage value does not belong to a first threshold range, the controller confirms that the access terminal is not connected to the external adapter.

10. The access terminal according to claim 1, wherein the detector is further configured to detect a voltage value at the interface, wherein when the voltage value belongs to a second threshold range, the controller confirms that the access terminal is connected to the external mobile power supply.

* * * * *